June 17, 1958     W. A. RICHARDSON     2,838,833
METHOD OF MANUFACTURING A CHAIN SAW CUTTER BAR
Filed Oct. 5, 1953     2 Sheets-Sheet 1
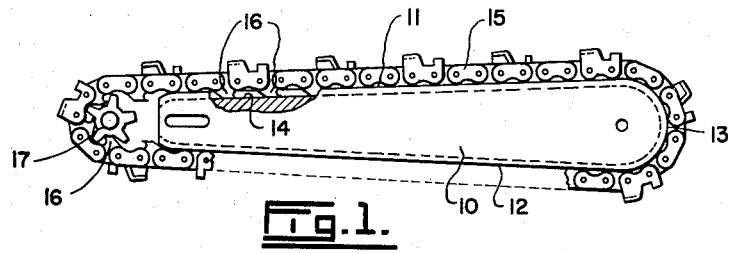
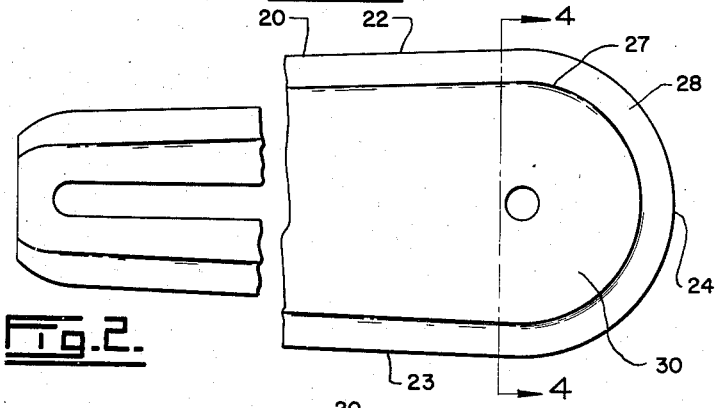
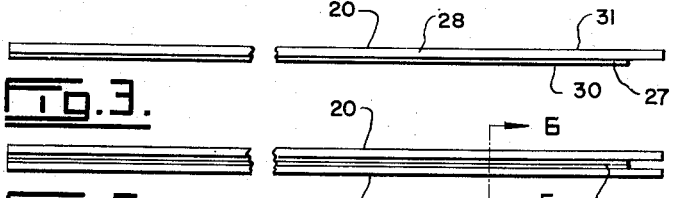
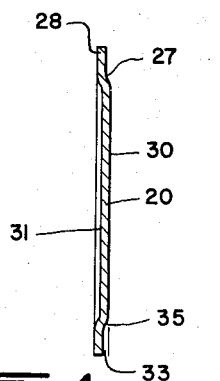
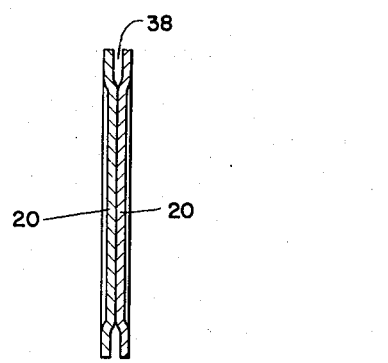
INVENTOR
WILLIAM A. RICHARDSON

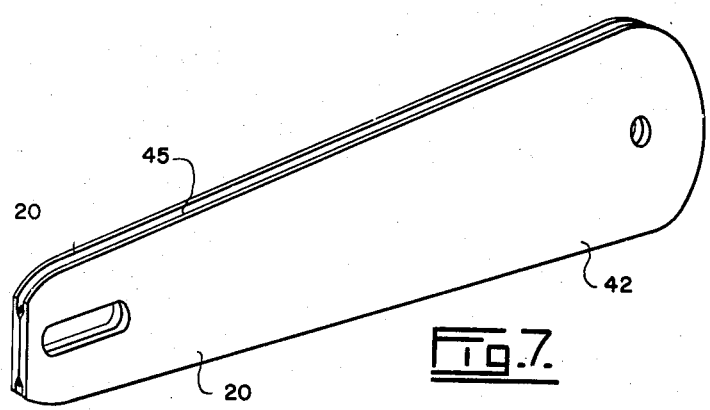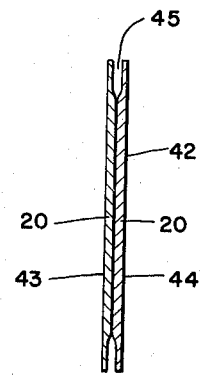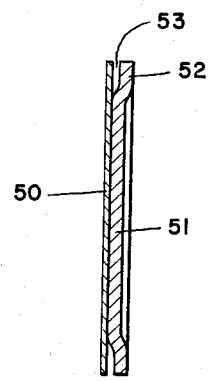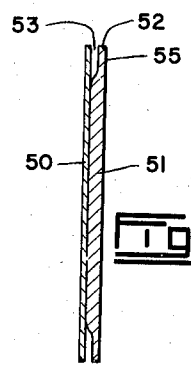

United States Patent Office 2,838,833
Patented June 17, 1958

2,838,833

METHOD OF MANUFACTURING A CHAIN SAW CUTTER BAR

William A. Richardson, Vancouver, British Columbia, Canada, assignor, by direct and mesne assignments, to Outboard Marine Corporation, Waukegan, Ill., a corporation of Delaware Application October 5, 1953, Serial No. 384,217

2 Claims. (Cl. 29—463)

This invention relates to improvements in a method of making a chain saw cutter bar.

A cutter bar for chain saws is an elongated bar having a groove in each of opposite edges thereof. These bars project outwardly from the power unit of a saw. Some bars have a pulley at the outer end, but most bars are curved at said end. In the latter case, the groove in the bar edges extends around the curved end. A chain made up of saw teeth and links having lugs extending into the bar groove is moved around the bar by the power unit.

Prior to the present invention, all cutter bars on the market were formed from a single piece of relatively heavy steel plate with a groove milled in its edge. Bars of this type are very costly and difficult to manufacture for the following reasons:

(1) The plate has to be cut into the desired shape. This is rather difficult owing to the thickness of the plate necessary to provide the desired strength.

(2) The bar must initially be in a soft condition for the milling operation, after which it is heat-treated to establish a usable hardness.

(3) The milling operation in the thin edge of the bar is difficult and costly. Milling cutters are very fragile and tend to wander laterally in the cut so that they are easily broken and the cut is practically never parallel with the faces of the bar. This, and the fact that considerable distortion results from the following heat treatment necessitates a tedious and costly straightening and surface grinding operation to ensure the necessary straightness of the groove and the bar relative to each other.

(4) As most of the errors in these bars relates to the groove, the errors do not come to light until the bar is practically finished. Thus, discards are costly, and there is a tendency to market bars not entirely satisfactory.

Many attempts have been made over a period of at least seven years to produce and market a three-ply cutter bar. As the total thickness of the bar is limited, each ply of these laminated bars was too thin and, therefore, the bars bend very easily. The laminated bars were infinitely easier and cheaper to make, but the main objection was that it was practically impossible to straighten them once they were bent, and cutter bars are normally subjected to such rough usage that even the strongest is often bent. In order to straighten a bar, it is necessary to hammer the metal to stretch some parts of it to get it back into line. The laminated bars could not be straightened because it was impossible to get at the middle ply to hammer it as required.

As the straightening difficulty was never overcome, there is no laminated cutter bar on the market at the present time. The magnitude of this difficulty will be realized when the enormous saving in time, effort and material resulting from the three-ply bar are taken into consideration. The industry had to go back to the tedious and expensive old type of cutter bar.

The present invention overcomes all these difficulties by providing a cutter bar made up of two mated and thin laminae of metal secured together flat against each other, said laminae being provided with the necessary shape of a cutter bar. A shallow groove is formed in the inner face of one or both of the laminae along the desired edge or edges thereof. If the groove is formed in one lamina only, it will have to have sufficient depth with respect to the thickness of the lamina to accommodate the lugs of a saw chain. It is, however, preferable to form a groove in both plates opposite each other so they combine to form a single groove in the bar opening out from the edge thereof for receiving the saw chain lugs.

The groove in the inner face of each lamina or plate may be milled therein, but as this entails some of the difficulties pointed out above in connection wtih a solid bar, it is preferable to offset each lamina outwardly along the desired edge or edges to form the groove. If both laminae are offset to form grooves, comparatively thin stock may be used so that the offset portions represent the maximum thickness of the bar. It is, however, preferable to use thicker stock and to remove the outer part of each offset in order to make the outer surface of the lamina flush.

One method according to this invention of manufacturing a chain saw cutter bar includes offsetting an elongated plate along an edge thereof to form a groove in a face of the plate opening out along said edge and subsequently removing the protruding metal from the offset portion on the opposite face of the plate to make the latter face flush. One of these plates may be secured to a flat plate having a similar contour, or it may be secured to another plate having a corresponding offset and groove. When two similar plates are used, they are secured together face to face with the grooves thereof opposite each other to create a single groove in the bar formed by said plates. It is to be understood that the method contemplates the formation of bars with or without flush outer surfaces.

A cutter bare made in accordance with this invention is much easier and cheaper to manufacture than the solid bars. The blank material is thinner than the single bar blank material, usually about one half the thickness of the latter. The thinner material is easier to process, and equipment and methods may be used which are impossible for the conventional bar. The thinness makes it possible to harden the metal before it is cut into shape and the groove or offset formed therein. As there is no heat treatment, the groove is not subjected to distortion. This process lends itself to constant inspection so that errors which might result in a faulty bar may be caught at a relatively early and inexpensive stage and the part discarded. The finished bar is just as efficient during use as a solid bar, does not bend as easily as a three-ply bar, and it may be easily straightened out after bending since both of the laminae are exposed for hammering.

Examples of improved cutter bars are illustrated in the accompanying drawings, in which, Figure 1 is a reduced diagrammatic view of a cutter bar with a saw chain extending around it, Figure 2 is a side elevation of a lamina or plate constructed in accordance with this invention, Figure 3 is a plan view of the plate in Figure 2, Figure 4 is a vertical section taken on the line 4—4 of Figure 2, Figure 5 is a plan view of a bar according to this invention without flush outer surfaces.

Figure 6 is a vertical section taken on the line 6—6 of Figure 5,

Figure 7 is a perspective view of a finished bar with flush outer surfaces,

Figure 8 is a vertical section similar to Figure 6 through a bar with flush outer surfaces, Figure 9 is a similar sectional view to Figure 6 showing an alternative form of bar with a flush surface on one side only, and Figure 10 is a view similar to Figure 9 of a bar with both outer surfaces flush.

Figure 1 illustrates an ordinary elongated cutter bar 10 having straight edges 11 and 12 along its long sides, and a curved outer end 13. A groove 14 is formed in the edge of the bar and extends along one side 11, the curved end 13 and the straight side 12. A saw chain 15 having lugs 16 extends around the bar and a driving sprocket 17 in line with the inner end of the latter. The lugs 16 ride in the groove 14 of the bar and keep the links of the chain thereon. The cutter bar 10 is a solid-type bar.

As the sprocket 17 is rotated by a suitable source of power, not shown, the saw chain is driven around the bar. This chain includes cutter links and connecting links, and as these chains are well known in the art, it is not necessary to describe one herein.

Figures 2 to 4 show a single lamina or plate 20 which has been prepared for a cutter bar in accordance with this invention. The plate 20 is usually formed of hardened steel and formed or cut in the desired shape for a cutter bar. In this example, the plate has opposed straight edges 22 and 23 and a curved outer end 24. A shallow groove 27 is formed along the opposite edges of the plate in the inner surface thereof, said groove also extending around the curved end 24. In this example, the groove is provided by forming an offset 28 along the edge of the plate. By referring to Figure 4, it will be seen that the groove 27 is in the inner surface 30 of the plate at the edges thereof, while the offset 28 projects from the opposite or outer surface 31 of the plate. The depth of the groove relative to the thickness of the plate, that is, the depth indicated by the numeral 33 in Figure 4, depends upon the manner in which the plate is used in the bar. As the plate of Figures 2 to 4 is intended to be used with another identical plate, the depth 33 of the groove is equal to one-half of the width of the groove required in the final cutter bar. The bottom 35 of the groove is spaced from the edge of the plate sufficient to clear the inner ends of the lugs 16 of the chain to be used on the bar.

Figures 5 and 6 show two mating laminae or plates 20 secured together flat against each other. The inner surfaces 30 of the two plates are placed against each other, and they are secured together in any convenient manner, such as by spot welding or riveting, the former being preferred. When the plates are secured together in this manner, the grooves 27 are opposite each other and they combine to form a single groove 38 in the opposite edges and the curved end of the bar.

The offsets 28 of the plates may be left as they are, in which case the offsets represent the maximum thickness of the bar and the width of the kerf which must be cut in the wood when the saw is in use. If the offsets are left on the bar, the stock from which the plates are formed would be thinner than would otherwise be the case. This represents a saving in material and in the weight of the bar, and the offsets act as stiffening ribs to give the bar more rigidity than it would otherwise have.

However, it is preferable to use side plates, the thickness of which is equal to one-half of the thickness of the finished bar in order to provide the maximum amount of strength. In this case, once the plates 20 have been secured together, the portions of the offsets 28 on the outer surfaces 31 of the plates are removed in any suitable manner, such as by grinding, in order to make said outer surfaces flush. Figures 7 and 8 illustrating a cutter bar 42 formed in this manner. The outer parts of the offsets have been removed so that the outer surfaces 43 and 44 of this bar are flush, that is, they are flat from edge to edge of the bar. The inner portions of the offsets form grooves which combine to provide a single groove 45 at the edge of the bar.

Figure 9 illustrates an alternative form of cutter bar consisting of a flat side plate or lamina 50 and another plate or lamina 51 which has been formed in the manner described in connection with Figures 2 to 4. In this case, however, plate 51 has been formed with an offset 52 around its edge, forming a groove 53 around said edge. The plates 50 and 51 are secured together face to face as described above, and the groove 53 forms the entire groove for the cutter bar. In other words the offset 52 is sufficient to form the entire groove. With this idea, the plate 51 is much thicker than plate 50, as shown.

While in Figure 9 the offset 52 has been left intact, the cutter bar illustrated in Figure 10 has been formed in the same manner, but the outer surface of the offset has been removed, as indicated at 55 in order to make the outer surface of the bar flush.

The plates with the offsets for the cutter bar are very easily manufactured. Each plate may be punched out into the outline of the final bar and pressed to form the peripheral offset either in two steps or in a single step. The punches and dies for this type of work are well-known in the art. As the maximum thickness for these plates is only one-half the thickness of the finished bar, there is no great difficulty in working the metal as is the case when a single piece of material is used for a bar.

What I claim as my invention is:

1. The method of manufacturing a chain saw cutter bar which includes offsetting each of two mated elongated plates of cutter bar shape along opposite edges thereof an amount less than the thickness of the plate to form grooves in a face of the plate opening out along said edges, placing the plates together face to face with the grooves opposite each other, securing the plates to each other throughout the entire width thereof from groove to groove to create a single groove in each of the opposite edges of the bar formed by the plates, said grooves being wide and deep enough to receive lugs of a saw chain, and the bottoms of said grooves along which saw chain lugs run being formed by the joined portions of the plates, and removing the protruding metal from the offset portions on the outer surfaces of the plates to make said surfaces flush, whereby the portions of the plates secured together constitute the maximum thickness of the bar.

2. The method of manufacturing a chain saw cutter bar which includes offsetting one of two mated elongated plates of cutter bar shape along opposite edges thereof an amount less than the thickness of a plate to form grooves in a face of the plate opening out along said edges, securing the plates together face to face throughout the full width thereof from groove to groove to create a groove in each of the opposite edges of the bar formed by the plates, said grooves being deep and wide enough to receive lugs of a saw chain, the bottoms of said grooves along which saw chain lugs run being formed by the joined portions of the plates, and removing the protruding metal from the offset portion of the outer surface of the offset plate to make said outer surface flush, whereby the portions of the plates secured together constitute the maximum thickness of the bar.

References Cited in the file of this patent

UNITED STATES PATENTS

| | | |
|---|---|---|
| 828,933 | Lachman | Aug. 7, 1906 |
| 830,860 | Smith | Sept. 11, 1906 |
| 893,897 | Bens | July 21, 1908 |
| 1,352,845 | Snyder | Sept. 14, 1920 |
| 2,086,857 | Derby | July 13, 1937 |
| 2,253,384 | Lown et al. | Aug. 19, 1941 |
| 2,315,357 | Smith | Mar. 30, 1943 |
| 2,357,230 | Shade | Aug. 29, 1944 |
| 2,540,688 | Novy | Feb. 6, 1951 |
| 2,645,254 | Van Ausdall | July 14, 1953 |
| 2,660,204 | Rosenboom | Nov. 24, 1953 |

FOREIGN PATENTS

| | | |
|---|---|---|
| 399,978 | Italy | Nov. 11, 1942 |